(12) United States Patent
Naik

(10) Patent No.: US 9,206,752 B2
(45) Date of Patent: Dec. 8, 2015

(54) AIR HANDLING SYSTEM FOR AN OPPOSED-PISTON ENGINE IN WHICH A SUPERCHARGER PROVIDES BOOST DURING ENGINE STARTUP AND DRIVES EGR DURING NORMAL ENGINE OPERATION

(71) Applicant: Achates Power, Inc., San Diego, CA (US)

(72) Inventor: Suramya D. Naik, San Diego, CA (US)

(73) Assignee: ACHATES POWER, INC., San Diego, CA (US)

( * ) Notice: Subject to any disclaimer, the term of this patent is extended or adjusted under 35 U.S.C. 154(b) by 0 days.

(21) Appl. No.: 14/170,015

(22) Filed: Jan. 31, 2014

(65) Prior Publication Data

US 2015/0219030 A1 Aug. 6, 2015

(51) Int. Cl.

| | | |
|---|---|---|
| F02B 33/44 | (2006.01) | |
| F02D 23/00 | (2006.01) | |
| F02D 41/00 | (2006.01) | |
| F02B 29/04 | (2006.01) | |
| F02B 37/18 | (2006.01) | |
| F02D 41/06 | (2006.01) | |
| F02B 25/08 | (2006.01) | |
| F02B 37/16 | (2006.01) | |
| F02B 37/04 | (2006.01) | |
| F02B 47/10 | (2006.01) | |
| F02B 75/28 | (2006.01) | |
| F02M 25/07 | (2006.01) | |

(52) U.S. Cl.
CPC ............ *F02D 41/0055* (2013.01); *F02B 25/08* (2013.01); *F02B 29/0406* (2013.01); *F02B 37/16* (2013.01); *F02B 37/18* (2013.01); *F02D 41/0007* (2013.01); *F02D 41/062* (2013.01); *F02M 25/0711* (2013.01); *F02B 37/04* (2013.01); *F02B 47/10* (2013.01); *F02B 75/282* (2013.01); *F02M 25/072* (2013.01); *F02M 25/0707* (2013.01)

(58) Field of Classification Search
CPC ..... F02F 1/186; F02M 25/0747; F02B 25/08; F02B 75/28; F02D 43/00; F02D 41/0007
USPC .............. 60/598, 599, 600, 602, 605.1, 605.2
See application file for complete search history.

(56) References Cited

U.S. PATENT DOCUMENTS 5,377,650 A * 1/1995 Warner .................... 123/568.29
5,509,394 A    4/1996 Hitomi et al.
(Continued)

FOREIGN PATENT DOCUMENTS

EP      2383449 A1    11/2011
JP      10008976 A *  1/1998   .............. F02B 37/04
(Continued)

OTHER PUBLICATIONS

International Search Report and Written Opinion for PCT application PCT/US2011/000864, mailed Aug. 1, 2011.
(Continued)

*Primary Examiner* — Audrey K Bradley
(74) *Attorney, Agent, or Firm* — Terrance A. Meador

(57) ABSTRACT

The air handling system of a turbocharged opposed-piston engine with uniflow scavenging includes an a supercharger operable to provide boost during startup and to drive EGR during normal engine operation.

24 Claims, 5 Drawing Sheets

(56) References Cited

U.S. PATENT DOCUMENTS

| | | |
|---|---|---|
| 6,742,335 B2 | 6/2004 | Beck et al. |
| 6,925,971 B1 | 8/2005 | Peng et al. |
| 6,948,475 B1 | 9/2005 | Wong et al. |
| 7,281,531 B1 | 10/2007 | Fulton et al. |
| 8,109,258 B2 | 2/2012 | Allain et al. |
| 2009/0159022 A1 | 6/2009 | Chu |
| 2009/0249783 A1 | 10/2009 | Gokhale et al. |
| 2010/0293943 A1 | 11/2010 | Teng et al. |
| 2010/0293944 A1 | 11/2010 | Hunter |
| 2011/0022289 A1 | 1/2011 | Hofbauer |
| 2011/0289916 A1 | 12/2011 | Dion et al. |
| 2012/0124996 A1 | 5/2012 | Boyer et al. |
| 2013/0098031 A1 | 4/2013 | Petrovic |
| 2013/0174548 A1 | 7/2013 | Dion |

FOREIGN PATENT DOCUMENTS

| | | |
|---|---|---|
| WO | WO 2011/146111 A1 | 11/2011 |
| WO | WO 2012/067643 A1 | 5/2012 |
| WO | WO 2013/126347 A1 | 8/2013 |
| WO | WO-2015116570 A1 | 8/2015 |

OTHER PUBLICATIONS

International Search Report and Written Opinion for PCT application PCT/US2013/026737, mailed Jun. 26, 2013.

International Search Report and Written Opinion for PCT application PCT/US2015/013028, mailed May 13, 2015.

\* cited by examiner

AIR HANDLING SYSTEM FOR AN OPPOSED-PISTON ENGINE IN WHICH A SUPERCHARGER PROVIDES BOOST DURING ENGINE STARTUP AND DRIVES EGR DURING NORMAL ENGINE OPERATION

RELATED APPLICATIONS

This application contains subject matter related to that of commonly-owned U.S. patent application Ser. Nos. 14/039,856 and 14/075,323, published as US 2015/0128907 A1, on May 14, 2015, and issued as U.S. Pat. No. 9,032,927 B1, on May 19, 2015.

BACKGROUND

The field is two-stroke cycle, opposed-piston engines. More specifically the application relates to a turbocharged, opposed-piston engine in which a supercharger provides boost pressure under start-up conditions and drives EGR during normal operating conditions.

A two-stroke cycle engine is an internal combustion engine that completes a cycle of operation with a single complete rotation of a crankshaft and two strokes of a piston connected to the crankshaft. The strokes are typically denoted as compression and power strokes. One example of a two-stroke cycle engine is an opposed-piston engine in which two pistons are disposed in opposition in the bore of a cylinder for reciprocating movement in opposing directions. The cylinder has longitudinally-spaced inlet and exhaust ports formed in the cylinder sidewall near respective ends of the cylinder. Each of the opposed pistons controls one of the ports, opening the port as it moves to a bottom center (BC) location, and closing the port as it moves from BC toward a top center (TC) location. One of the ports provides passage for the products of combustion out of the bore, the other serves to admit charge air into the bore; these are respectively termed the "exhaust" and "intake" ports. In a uniflow-scavenged opposed-piston engine, charge air enters a cylinder through its intake port as exhaust gas flows out of its exhaust port, thus gas flows through the cylinder in a single direction ("uniflow")—from intake port to exhaust port.

Air and exhaust products flow through the cylinder via an air handling system. Fuel is delivered by injection from a fuel delivery system. As the engine cycles, a control mechanization governs combustion by operating the air handling and fuel delivery systems in response to engine operating conditions. The air handling system may be equipped with an exhaust gas recirculation ("EGR") system to reduce undesirable compounds produced by combustion.

In an opposed-piston engine, moving fresh air into the intake manifold and exhausting spent gases out of the engine require pumping work. In typical opposed-piston engine air handling systems the pumping work is done by one or more pumps, such as a supercharger or blower, either of which takes its power from the engine crank. If a turbocharger is included in the engine air handling system, it uses some of the exhaust energy to increase the intake air density to provide a higher mass of trapped air in the cylinder and requires pumping energy only from the exhaust gasses.

The pumping device that drives air from the intake to the exhaust drives the scavenging process, which is critical to ensuring effective combustion, increasing the engine's indicated thermal efficiency, and extending the lives of engine components such as pistons, rings, and cylinders. This pumping work also drives the EGR system by creating a pressure difference across the EGR channel. However, in some operating conditions like low load situations, the EGR requirements for reducing NOx may be much higher than the trapped air requirements for good combustion. When this happens, the trapped air mass ends up being higher than needed, which can result in higher NOx production as well as dilution of recirculated exhaust gas by oxygen molecules, making EGR less potent for reducing NOx. This will increase the required exhaust recirculation rate to meet NOx standards and therefore will result in higher pumping losses. Therefore, total pumping work of the air handling system would be reduced by separating the in-cylinder air requirements for the scavenging process from the EGR requirements.

Two-stroke engines with large displacements and high power ratings are equipped with air handling systems capable of pumping large amounts of air. Consider, for example a two-stroke cycle, opposed-piston engine having a displacement of 15 L (or higher) that is rated at 500+ hp. The mass air flow required for operation of such an engine necessitates large pumping devices. In some large, turbocharged opposed-piston engines, turbo device size benefits engine operation. In this regard, large turbochargers have large volumes compared to their surface areas, which result in very efficient pumping operation. For example, large turbochargers may exhibit compressor efficiencies in excess of 80% and turbine efficiencies that approach 80%. During typical engine operating conditions, compressor-out pressures are higher than the turbine inlet pressures because of higher efficiencies delivered by these devices, thereby creating a pressure difference between intake and exhaust to drive scavenging. In many instances, large engines that use large turbochargers typically require a supercharger or compressed air from an auxiliary device to deliver boost pressure for start-up. However once the engine is running with a sufficient amount of mass flow through it, the compressor provides sufficient boost. In these large engines an additional pumping device is usually needed for driving EGR because the exhaust pressures are lower than the turbocharger-driven compressor output pressure.

In order to limit engine size, complexity, and cost, it is desirable to reduce the number of auxiliary pumping devices in the air handling system of a turbocharged opposed-piston engine. It is further desirable to arrange the reduced number of pumping devices so as to reduce pumping losses by separating mass air flow from EGR. Yet further benefit is realized if the reduced number of pumping devices is attached to, or integral with, the engine, which permits the engine to be used at various locations and for a variety of applications where a compressed air supply separate from the engine may not be available to provide boost for starting the engine.

SUMMARY

A turbocharged, opposed-piston engine includes an air handling system with a supercharger subsystem that is operable to drive boost air during initial startup conditions and to drive EGR after the engine has been started. Utilization of a supercharger to perform to two standard air handling functions reduces the pumping device count to the benefit of engine size, complexity, and cost, while enhancing the pumping efficiency and mobility of the engine.

BRIEF DESCRIPTION OF THE DRAWINGS

The below-described drawings are meant to illustrate principles and examples discussed in the following description. They are not necessarily to scale.

DETAILED DESCRIPTION

In this disclosure, "fuel" is any fuel that can be used in an opposed-piston engine. The fuel may be a relatively homogeneous composition, or a blend. For example, the fuel may be diesel fuel, natural gas, gasoline, or another fuel ignitable by compression, pilot, and/or spark ignition. Further, the descriptions contemplate ignition resulting from compression of an air/fuel mixture; however in some instances it may be desirable to provide additional mechanisms, such as glow plugs or pilot injections, to assist compression ignition.

According to this disclosure, fuel is injected into compressed air in a combustion chamber formed between the end surfaces of opposed pistons when the pistons are at or near TC locations. In other aspects, injection may occur earlier in the compression stroke, soon after closure of both ports. The air is preferably ambient air; however, it may include other components such as exhaust gases or other diluents. In any such case, the air is referred to as "charge air."

Figure 1:
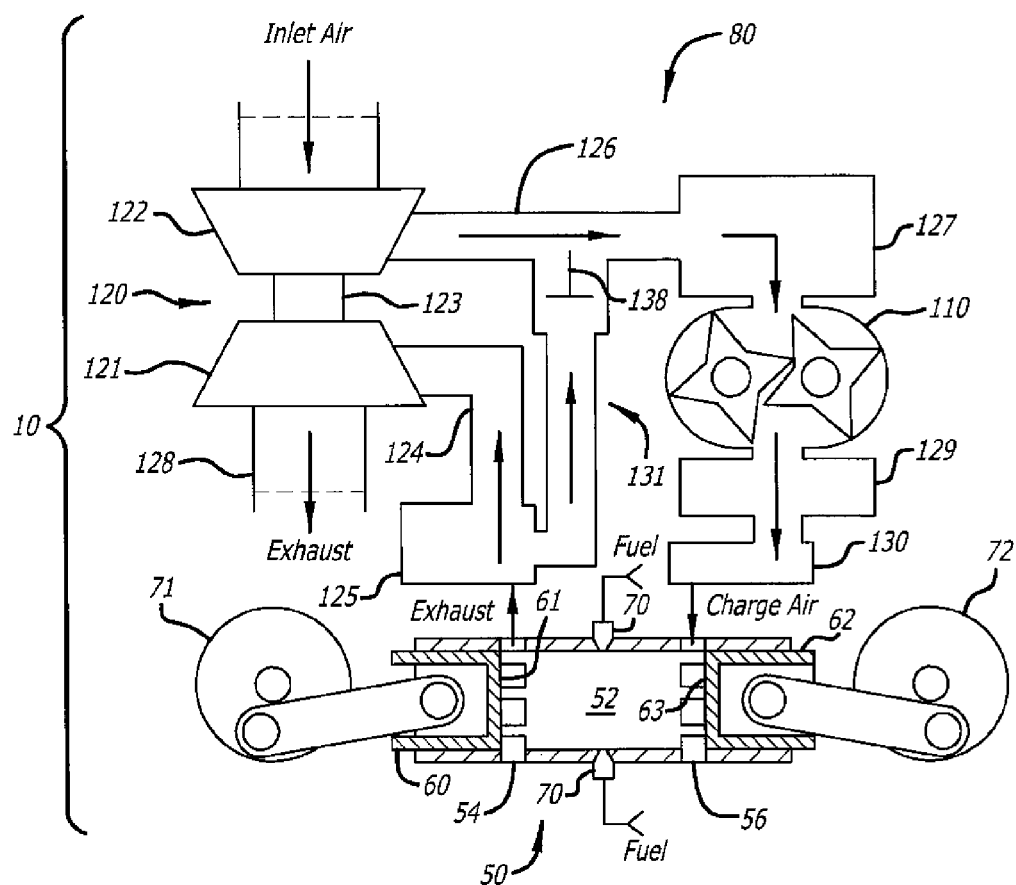
FIG. 1 is a schematic diagram of a prior art two-stroke cycle, opposed-piston engine with uniflow scavenging, and is appropriately labeled "Prior Art".

FIG. 1 illustrates a turbocharged, two-stroke cycle, opposed-piston engine 10 with uniflow scavenging, which is taken to be representative of turbocharged, opposed-piston engines with different cycles of operation and scavenging configurations. The engine 10 has at least one ported cylinder 50. For example, the engine may have one ported cylinder, two ported cylinders, three ported cylinders, or four or more ported cylinders. Each ported cylinder 50 has a bore 52 and longitudinally-spaced exhaust and intake ports 54 and 56 formed or machined near respective ends of a cylinder wall. Each of the exhaust and intake ports 54 and 56 includes one or more circumferential arrays of openings in which adjacent openings are separated by a solid bridge. In some descriptions, each opening is referred to as a "port"; however, the construction of a circumferential array of such "ports" is no different than the port constructions shown in FIG. 1. Pistons 60 and 62 are slidably disposed in the bore 52 with their end surfaces 61 and 63 opposing one another. The piston 60 controls the exhaust port 54, and the piston 62 controls the intake port 56. In the example shown, the engine 10 further includes at least one crankshaft; preferably, the engine includes two crankshafts 71 and 72. In the example shown, the exhaust pistons 60 of the engine are coupled to the crankshaft 71, and the intake pistons 62 to the crankshaft 72.

As the pistons 60 and 62 near TC, a combustion chamber is defined in the bore 52 between the end surfaces 61 and 63 of the pistons. Combustion timing is frequently referenced to the point in a compression cycle where minimum combustion chamber volume occurs; this point is referred to as "minimum volume." Fuel is injected directly into cylinder space located between the end surfaces 61 and 63. In some instances injection occurs at or near minimum volume; in other instances, injection may occur before minimum volume. Fuel is injected through fuel injector nozzles 68 and 70 positioned in respective openings through the sidewall of the cylinder 50. Preferably, the fuel injector nozzles 68 and 70 are positioned to inject respective sprays of fuel in opposing directions along a diameter of the bore 52. The fuel mixes with charge air admitted into the bore 52 through the intake port 56. As the air-fuel mixture is compressed between the end surfaces 61 and 63, the compressed air reaches a temperature that causes the fuel to ignite. Combustion follows.

With further reference to FIG. 1, the engine 10 includes an air handling system 80 that manages the transport of charge air provided to, and exhaust gas produced by, the engine 10. A representative air handling system construction includes a charge air subsystem and an exhaust subsystem. In the air handling system 80, a charge air source receives fresh air and processes it into charge air. The charge air subsystem receives the charge air and transports it to the at least one intake port of the engine. The exhaust subsystem transports exhaust products from exhaust ports of the engine for delivery to other exhaust components.

The air handling system 80 includes a turbocharger 120 with a turbine 121 and a compressor 122 that rotate on a common shaft 123. The turbine 121 is in fluid communication with the exhaust subsystem and the compressor 122 is in fluid communication with the charge air subsystem. The turbocharger 120 extracts energy from exhaust gas that exits the exhaust ports 54 and flows into an exhaust channel 124 directly from the exhaust ports 54, or from an exhaust manifold assembly 125 that collects exhaust gasses output through the exhaust ports 54. In this regard, the turbine 121 is rotated by exhaust gas passing through it to an exhaust outlet channel 128. This rotates the compressor 122, causing it to generate charge air by compressing fresh air. The charge air subsystem includes a supercharger 110 and an intake manifold 130. The charge air subsystem further includes at least one intercooler (hereinafter, "cooler") to receive and cool the charge air before delivery to the intake port or ports of the engine. The charge air output by the compressor 122 flows through a charge air channel 126 to a cooler 127, whence it is pumped by the supercharger 110 to the intake ports. Charge air compressed by the supercharger 110 is output to an intake manifold 130. The intake ports 56 receive charge air pumped by the supercharger 110, through the intake manifold 130. Preferably, in multi-cylinder opposed-piston engines, the intake manifold 130 is constituted of an intake plenum that communicates with the intake ports 56 of all cylinders 50. A second cooler 129 may be provided between the output of the supercharger 110 and the input to the intake manifold 130.

In some aspects, the air handling system 80 may be constructed to reduce NOx emissions produced by combustion by recirculating a portion of the exhaust gas produced by combustion through the ported cylinders of the engine. The recirculated exhaust gas is mixed with charge air to lower peak combustion temperatures, which reduces production of NOx. This process is referred to as exhaust gas recirculation ("EGR"). The EGR construction shown obtains a portion of the exhaust gasses flowing from the port 54 during scavenging and transports them via an EGR channel 131 external to the cylinder into the incoming stream of inlet air in the charge air subsystem. The recirculated exhaust gas flows through the EGR channel 131 under the control of a valve 138 (this valve may also be referred to as the "EGR valve").

Figure 2:
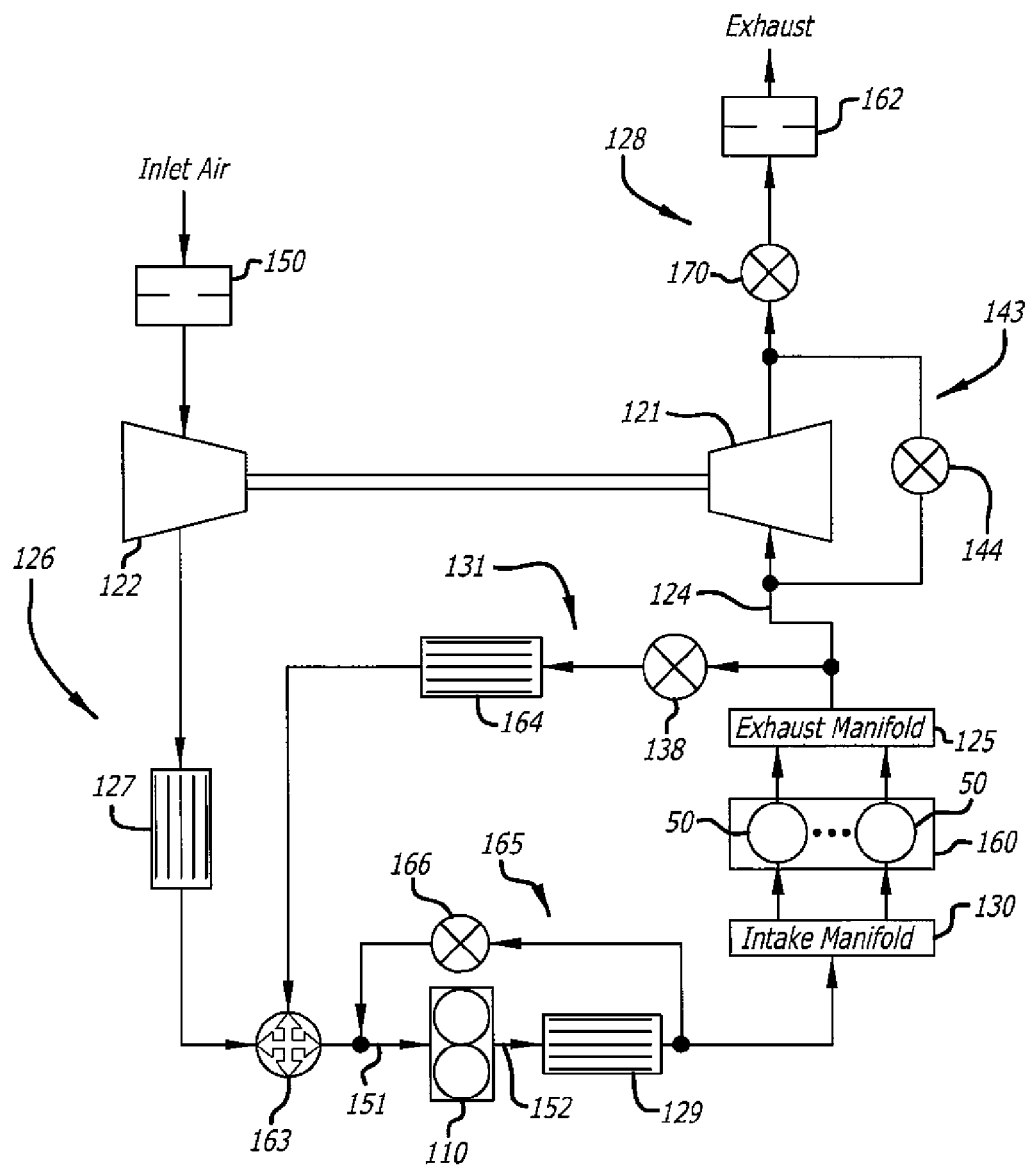
FIG. 2 is a schematic diagram showing details of a prior art air handling system for an opposed-piston, and is appropriately labeled "Prior Art".

FIG. 2 shows the air handling system 80 of FIG. 1 in greater detail. In this regard, the charge air subsystem provides air to the compressor 122 via an air filter 150. As the compressor 122 rotates, compressed air flows from the compressor's outlet, through the charge air channel 126, and into the inlet 151 of the supercharger 110. Charge air pumped by the supercharger 110 flows through the supercharger's outlet 152 into the intake manifold 130. Pressurized charge air is delivered from the intake manifold 130 to the intake ports of the cylinders 50, which are supported in an engine block 160. The second cooler 129 may be provided in the charge air subsystem, in series between the output of the supercharger 110 and the intake manifold 130.

Exhaust gasses from the exhaust ports of the cylinders 50 flow from the exhaust manifold 125 into the inlet of the turbine 121, and from the turbine's outlet into the exhaust outlet channel 128. A turbine bypass channel 143 including a wastegate valve 144 runs in parallel with the turbine 121, between its inlet and outlet. The valve 144 is operated to control the amount of exhaust gas flowing from the engine into the turbine 121. Fully opening the valve 144 to bypass the turbine 121 allows exhaust energy to be transported into the exhaust outlet channel 128 without operating the turbine 121 and compressor 122. In some instances, one or more aftertreatment devices 162 are provided in the exhaust outlet channel 128. Exhaust is recirculated through the EGR channel 131, under control of the EGR valve 138. The EGR channel 131 is in fluid communication with the charge air subsystem via an EGR mixer 163. In some instances, although not necessarily, an EGR intercooler ("EGR cooler 164") is provided in the EGR channel 131, in series with the EGR valve 138 and the EGR mixer 163. In other instances, there may be no cooler in the EGR channel 131.

With further reference to FIG. 2, the air handling system 80 is equipped for control of gas flow at separate control points in the charge air and exhaust subsystems. In the charge air subsystem, charge air flow and boost pressure are controlled by operation of a recirculation channel 165 coupling the outlet 152 of the supercharger to the supercharger's inlet 151. The recirculation channel 165 includes a valve (the "recirculation valve") 166 that governs the flow of charge air into, and thus the pressure in, the intake manifold 130. A valve (the "backpressure valve") 170 may be provided in the exhaust outlet channel 128 to govern the flow of exhaust out of, and thus the backpressure in, the exhaust subsystem. In those instances when it is provided, the backpressure valve is positioned in the exhaust outlet channel 128, between the output of the turbine 121 and the after-treatment devices 162.

In some instances, additional control of gas flow (and pressure) is provided by way of a variable-speed supercharger and/or a variable-geometry turbine. Thus, in some aspects the supercharger 110 is coupled by a drive mechanism (not shown) to a crankshaft, or another rotating element of the engine, to be driven thereby. The drive mechanism can comprise a stepwise transmission, or continuously variable transmission (CVT), device, in which cases, charge air flow, and boost pressure, may be varied by varying the speed of the supercharger 110 in response to a speed control signal provided to the drive mechanism. In other instances, the supercharger may be a single-speed device. In those aspects where the turbine 121 is a variable-geometry device it has an effective opening size that may be varied in response to changing speeds and loads of the engine.

This disclosure is directed only to aspects of air handling system construction and operation with the understanding that these aspects may be combined with other systems and functions such as fuel injection, cooling, lubrication, and so on in a turbocharged, opposed-piston engine. An air handling system for a turbocharged opposed-piston engine in which a supercharger provides boost during engine startup and drives EGR during normal engine operation is illustrated by embodiments shown in FIGS. 3 and 4, in which the air handling system according to FIG. 2 is modified according to this disclosure. In these embodiments, the supercharger 110 is disposed in parallel with the compressor 122 and in series with the EGR channel 131. Although not shown in these figures, a backpressure valve may be provided in the exhaust outlet channel 128 as per FIG. 2, or not, according to design requirements. In each embodiment, the air handling system is set to a first mass air flow path during startup and idle conditions in which mass air flow driven by the supercharger alone bypasses the compressor. During engine load conditions, the air handling system is set to a second mass air flow path in which mass air flow is driven through the engine by the compressor while the supercharger alone drives EGR. In the first mass air flow path, mass air flow exits the engine through very low flow impedance; in the second mass air flow path, mass air flow exits the engine through increased flow impedance.

First Embodiment

Figure 3:
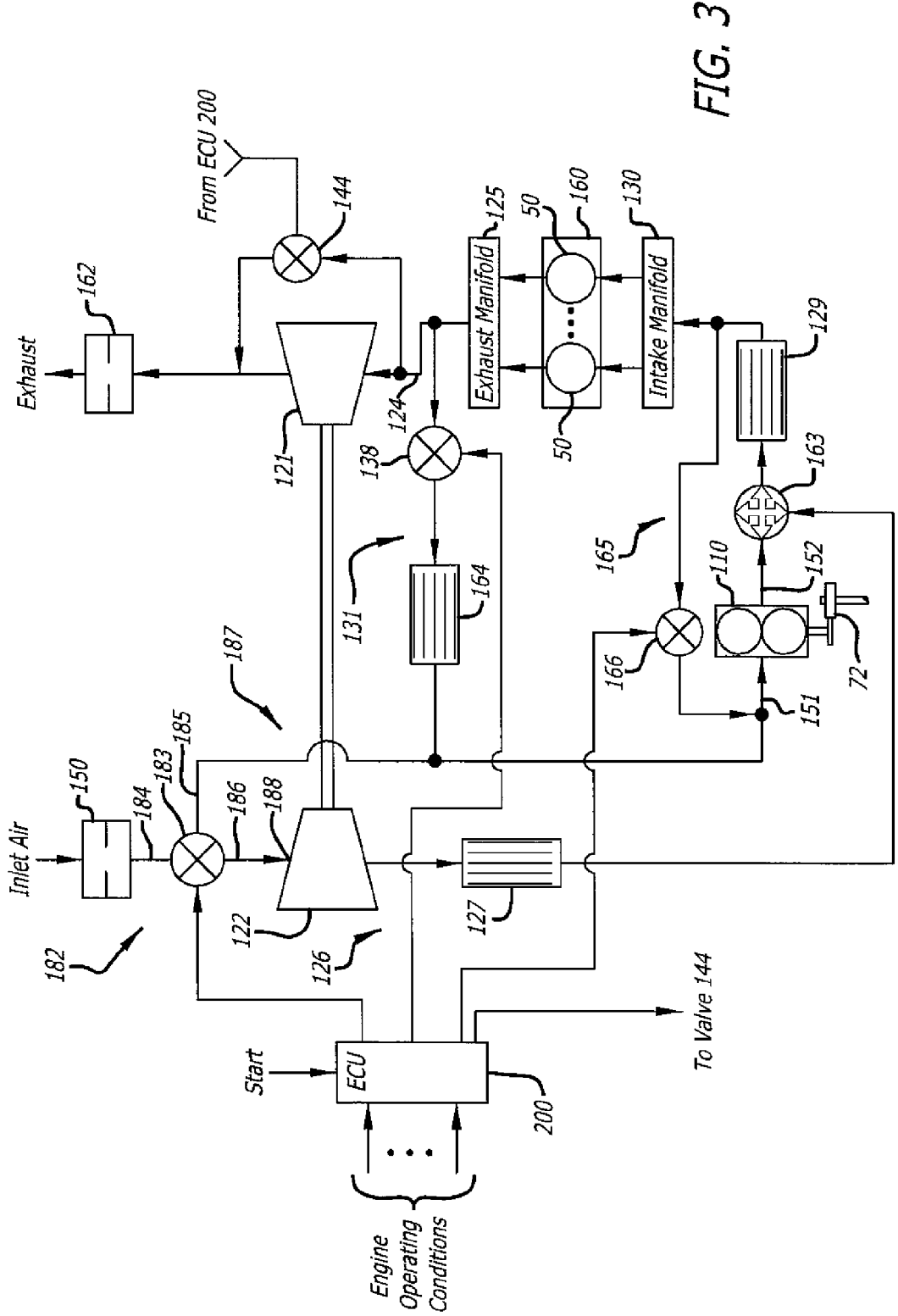
FIG. 3 is a schematic diagram showing details of an air handling system for a two-stroke cycle, opposed-piston engine according to a first embodiment of this disclosure.

A first air handling embodiment according to this disclosure is shown in FIG. 3, wherein the supercharger inlet 151 is connected to three air handling channels: an air intake channel 182; the EGR channel 131; and the recirculation channel 165. Each of the air handling channels 182, 131, and 165 has its own independent valve to control gas flow. The valves 138 and 166 controlling the EGR and recirculation channels 131 and 165 are as described above with respect to FIG. 2. The air intake channel 182 includes a control valve 183 having an inlet port 184 for receiving filtered ambient air and outlet ports 185 and 186. The outlet port 185 is in fluid communication via an inlet shunt channel 187 with the outlet of the EGR channel 131, the outlet of the recirculation channel 165, and the supercharger inlet 151. The outlet 186 is in fluid communication with the compressor inlet 188.

The EGR mixer 163 is located downstream from the supercharger 110 and receives inputs from the outlet of the charge air channel 126 and the supercharger outlet 152. The output of the mixer 163 is transported by the cooler 129 to the intake manifold 130.

In some aspects, the supercharger 110 is driven by the intake crankshaft 72; alternatively it may be driven by the exhaust crankshaft 71, or possibly by other, or additional, means. For example, the supercharger 110 can also be mechanically connected to a compressor out air driven turbine (not shown), or exhaust driven turbine (not shown), or to an electrical motor (not shown) to help reduce its power requirements from the engine crank and thus reduce the pumping loss of the system, which will improve brake specific fuel consumption (BSFC). Such configurations have been discussed in application Ser. No. 13/782,802, filed Mar. 1, 2013, published as US 2013/0174548 A1, on Jul. 11, 2013.

The inlet shunt channel 187 runs parallel to the charge air channel 126, providing an air transport path to shunt intake air around the compressor to the inlet 151 of the supercharger 110 during start up, before the compressor 121 is capable of producing charge air at a pressure sufficient to support scavenging. Otherwise, the inlet shunt channel 187 may be blocked, thereby limiting the inputs to the supercharger 110 to recirculated exhaust gas via the EGR channel 131 and recirculated output from the supercharger 110 via the recirculation channel 165. During engine operation, inlet air may be apportioned between the charge air channel 126 and the inlet shunt channel 187 according to engine operating conditions.

An engine control mechanization includes an engine control unit (ECU) 200 in combination with the valves 138, 144, 166, and 182 (and, possibly, other valves, such as a backpressure valve). The ECU 200 may be configured to control charge air flow, boost flow, and the amount of exhaust gas mixed with the pressurized charge air in response to specified engine operating conditions by operably controlling the valves 138, 144, 166, and 182. Of course, operation of valves and associated elements used for air handling control can include any one or more of electrical, pneumatic, mechanical, and hydraulic actuating operations. For fast, precise automatic operation, it is preferred that the valves be high-speed, computer-controlled devices with continuously-variable settings. Preferably, each of the valves 138, 144, and 166 is a two-way valve having a state in which it is open (to some setting controlled by the ECU 200) to allow gas to flow through it, and a state in which it is closed to block gas from flowing through. Preferably, the valve 183 is a three-way valve; it is controlled by the ECU 200 to connect the inlet 184 to either or both of the outlets 185 and 186. In some aspects, the turbine 121 may be a variable geometry device, in which cases, the wastegate valve 144 may be eliminated, and the ECU 200 configured to control the turbine geometry.

Second Embodiment

Figure 4:
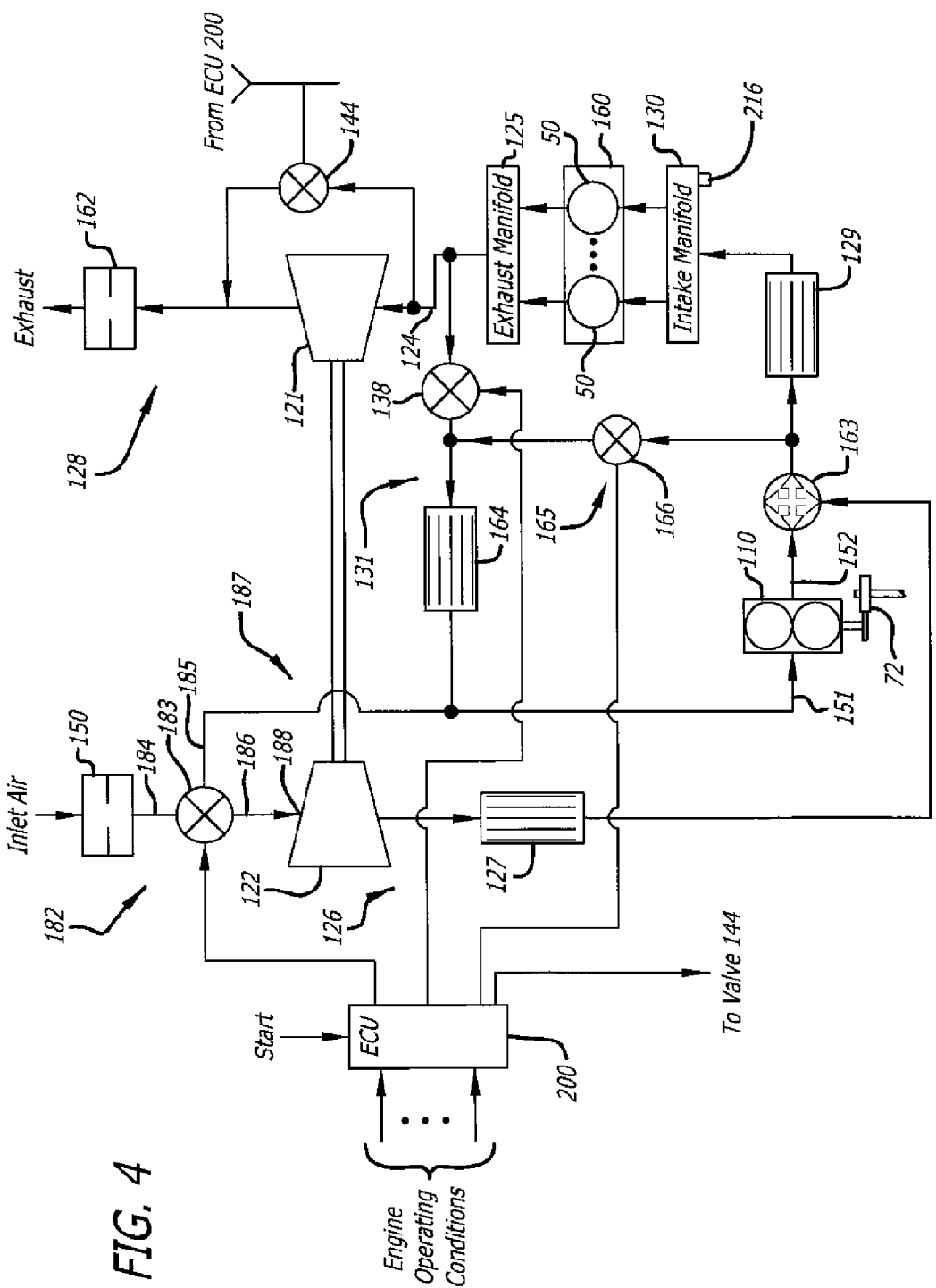
FIG. 4 is a schematic diagram showing details of an air handling system for a two-stroke cycle, opposed-piston engine according to a second embodiment of this disclosure.

The first embodiment shown in FIG. 3 may be reconfigured as shown in FIG. 4, in which the supercharger recirculation channel 165 runs between the outlet of the mixer 163 and the outlet of the EGR valve 138. Thus, the valve 166 obtains an input of charge air mixed with recirculated exhaust from a location between the outlet of the mixer 163 and the inlet of the cooler 129, and provides its output at the inlet of the EGR cooler 164. The recirculation channel 165 now includes 166, 164, 110, and 163, and shares the EGR cooler 164 with the EGR channel 131. This configuration may enhance the operation and lifetime of the EGR cooler 164 because it mitigates the thermal effects of the hot exhaust gas by mixing a cooled mixture of fresh air and recirculated exhaust delivered at the outlet of the supercharger 110 with hot exhaust gas provided at the output of the EGR valve 138. The effect is to lower the temperature of gas entering the EGR cooler, which helps reduce cooler fouling.

Although FIGS. 3 and 4 show both coolers 127 and 129, this arrangement can be modified according to design considerations. For example, the cooler 129 may be invested with a large enough capacity to cool both the combined outputs of the supercharger and the compressor. In such cases the cooler 127 may be eliminated from the charge air channel altogether. However, if the engine construction does not provide the opportunity to enlarge the cooler 129 as may be required to adequately cool outputs from the compressor 122 and the supercharger 110, the cooler 127 may be provided in the charge air channel as per FIGS. 3 and 4. Alternatively, presuming low enthalpy of gas coming out of the supercharger 110, the coolers 127 and 164 may provide enough cooling capacity to eliminate the need for the cooler 129.

Methods of Operation:

During startup of a turbocharged, opposed-piston engine having an air handling system according to this specification, mass airflow through the engine bypasses the compressor altogether, being driven by the supercharger alone. At the same time, the flow impedance encountered by exhaust flow exiting the engine is reduced to a very low level by opening the wastegate valve 144 if a fixed geometry turbine is used, and/or by setting the turbine geometry for a high (or maximum) flow rate if a VGT device is used. In some aspects, EGR and supercharger recirculation are blocked during startup. In these cases, as the engine transitions from start to an idle condition, EGR and supercharger recirculation are brought up to idle targets. With the compressor still bypassed, the supercharger alone drives both mass airflow and EGR during idle. When transitioning from idle in response to an increase in engine load and/or speed, the turbocharger is brought online to drive mass airflow, while EGR continues to be driven by the supercharger. In this regard, the turbocharger is brought online by diverting mass flow from the supercharger to the compressor, while increasing the flow impedance encountered by exhaust flow exiting the engine by closing the wastegate valve 144 if a fixed geometry turbine is used, and/or by setting the turbine geometry for a low flow rate if a VGT device is used.

Figure 5:
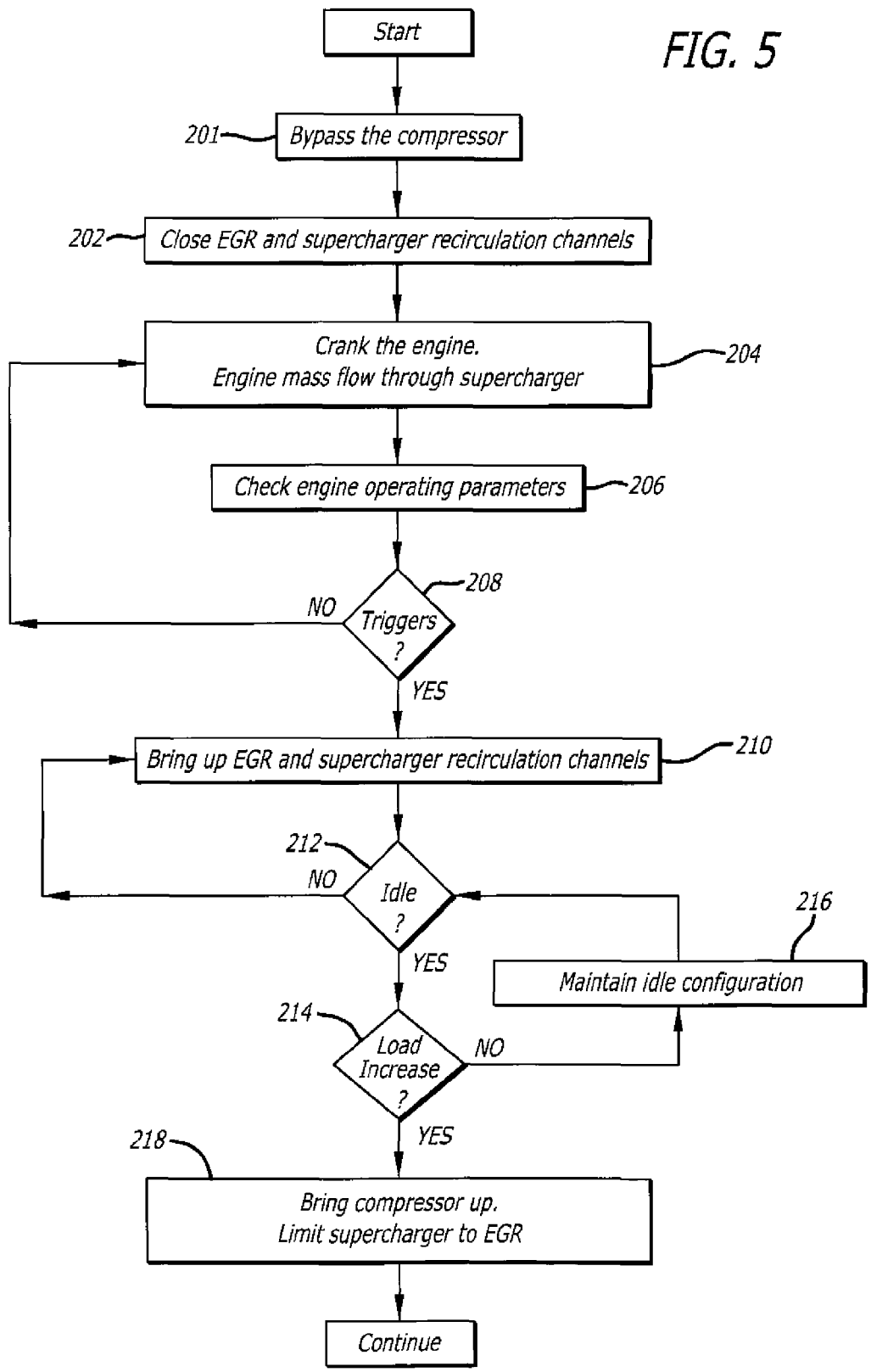
FIG. 5 is a flow diagram illustrating air handling operation during engine startup according to this disclosure.

Methods of operating an air handling system for a turbocharged opposed-piston engine according to this disclosure may be governed by a control mechanization including the ECU 200, or possibly another control mechanism. For example, the ECU 200 may be configured to control the operation of the air handling system during start, idle, and other operating states of a turbocharged, two-stroke cycle, opposed-piston engine. In this regard, with reference to FIGS. 3, 4, and 5, when an engine start condition (START) is detected, in step 201 the air handling system is configured by setting the valve 184 to transport inlet air through inlet shunt channel 187 to the supercharger 110 and to close the charge air channel by blocking transport of inlet air to the inlet of the compressor 122. At the same time, the wastegate valve 144 is fully opened. Mass airflow through the engine is thus driven by the supercharger 110 alone through a mass air flow path (182, 183, 187, 110, 163, 129, 130, 50, 125, 124, 144) that bypasses both the compressor 122 and the turbine 121. Alternatively, if the turbine 121 is a variable geometry device it may be opened to a degree where it creates no boost at low engine speeds; in this case the mass air flow path is 182, 183, 187, 110, 163, 129, 130, 50, 125, 124, and 121. At the same time, in step 202 the EGR and bypass channels 131 and 165 are closed by closing the EGR valve 138 and recirculation valve 166, thus preventing recirculation of exhaust gasses and supercharger output. In step 204 the supercharger 110 starts pumping inlet air while the engine is being cranked (by a starter motor, for example) thereby providing boost, which increases the intake manifold pressure compared to the exhaust pressure so as to create the positive pressure differential from the exhaust manifold 125 to the intake manifold 130 that is required for scavenging.

As the engine picks up speed while being cranked, engine operating parameters are checked in step 206 and tested in decision 208 for EGR and supercharger recirculation calibration triggers. When engine operating conditions indicate that EGR and recirculation thresholds have been reached, the EGR and recirculation channels 131 and 165 are partially opened in step 210 by gradually opening the valves 138 and 166. When an engine idling condition is detected in decision 212, cranking ceases and the engine operates in response to combustion, under control of an idle governor (a routine or module executed by the ECU 200, for example). In the idle state, mass airflow still bypasses the compressor 122, being pumped solely by the supercharger 110, with the EGR and recirculation channels 131 and 165 operating at partial capacity. Per decision 214, as long as there is no increase in engine load, the method maintains the idle configuration of the air handling system at 216.

At decision 214, once an increase in engine load and/or speed is detected, the air handling system is reconfigured at 218 by bringing the turbocharger on line and limiting the function of the supercharger to exhaust gas recirculation alone. Thus, at 218 the turbocharger is brought up to operational speed by raising flow impedance presented to exhaust via closing the wastegate valve 144 (or reducing the turbine opening) while gradually changing the setting of the valve 183 to close the inlet shunt channel 187 and open the inlet 188 of the compressor 122. In other words, engine mass air flow is transported into the air handling system via the compressor 122 and exits via the turbine 121. In this case, the mass air flow path is 182, 183, 122, 163, 129, 130, 50, 125, 124, 121. Concurrently, the EGR valve 138 is further opened to accommodate the increased engine load and/or speed. The pressure out of the supercharger 110 is trimmed to provide the recirculated exhaust at a level appropriate to the load and speed of the engine by setting the position of the supercharger recirculation valve 166. At the same time in step 218, EGR flow and supercharger recirculation may be adjusted in response to the changing engine operating conditions.

As the speed of the turbine 121 increases in response to the flow of exhaust gas from the manifold 125, the pressure ratio of the compressor 122 increases. When the out pressure ratio of the compressor 122 matches the out pressure of the supercharger 110, the inlet shunt channel 187 to the supercharger 110 is closed by way of the valve 183, while the EGR valve 138 is further adjusted for a desired EGR flow. The compressor 122 now outputs charge air to the charge air channel 126. From the charge air channel 126, charge air is transported through an inlet of the mixer 163 to be mixed therein with recirculated exhaust gas pumped by the supercharger 110. Charge air flows from an outlet of the mixer 163 through the cooler 129 to the intake manifold 130. In a condition where EGR mass flow is significant and the supercharger inlet/outlet gas temperature is higher than a required limit for the durability of the engine, the supercharger recirculation valve 166 is opened further, which reduces the supercharger inlet temperature. The supercharger recirculation valve may also be adjusted to reduce the power consumed by the supercharger based on reduced mass flow.

In engine operating conditions that choke the compressor, (high ambient air temperature, high altitude conditions, or rated power/full load operating points) both outputs 185 and 186 may be opened in order to reduce the flow through the compressor 122 while still maintaining a compressor pressure ratio at a level high enough to prevent compressor choking.

Although this disclosure describes particular air handling embodiments for a turbocharged opposed-piston engine, these embodiments are set forth merely as examples of underlying principles of this disclosure. Thus, the embodiments are not to be considered in any limiting sense.

The invention claimed is:

1. An opposed-piston engine including at least one cylinder with exhaust and intake ports, a charge air channel to provide charge air to at least one intake port of the engine, and a turbocharger, the turbocharger including a turbine inlet in fluid communication with at least one exhaust port of the engine, a turbine outlet, a compressor inlet for receiving inlet air, and a compressor outlet in fluid communication with the charge air channel, in which the engine comprises:
an EGR (exhaust gas recirculation) channel having an outlet and an inlet in fluid communication with the exhaust port;
a supercharger in fluid communication with the EGR channel outlet to pump exhaust gas through the EGR channel;
a recirculation channel for transporting pressurized air produced by the supercharger to a supercharger inlet;
an inlet shunt channel in fluid communication with the supercharger inlet;
a mixer in fluid communication with a supercharger outlet and the charge air channel, and operable to provide charge air to the at least one intake port; and,
an engine control mechanization operable to detect an engine start condition and to operate the EGR channel, the recirculation channel, and the inlet shunt channel in response to the start condition by:
closing the EGR and recirculation channels; and,
causing inlet air to flow through the inlet shunt channel to the supercharger inlet while preventing inlet air from flowing to the compressor inlet.

2. The opposed-piston engine of claim 1, wherein the engine control mechanization is further operable to detect an engine load and/or speed condition and to operate the inlet shunt channel in response to the engine load and/or speed condition by:
causing inlet air to flow to the compressor inlet; and,
closing the inlet shunt channel.

3. The opposed-piston engine of claim 1, wherein the engine control mechanization is further operable to operate the EGR channel in response to the engine load and/or speed condition by opening the EGR channel.

4. The opposed-piston engine of claim 3, wherein the mixer is operable to mix exhaust gas output by the supercharger with charge air flowing in the charge air channel during the engine load and/or speed condition.

5. The opposed-piston engine of claim 1, further including a first cooler in fluid communication with the mixer for cooling the charge air provided to the at least one intake port.

6. The opposed-piston engine of claim 5, further including a second cooler in the charge air channel.

7. The opposed-piston engine of claim 5, in which the recirculation channel includes an inlet in fluid communication with an outlet of the first cooler, an outlet in fluid communication with the supercharger inlet, and a valve operably controlled by an engine control unit.

8. The opposed-piston engine of claim 5, in which the recirculation channel includes an inlet in fluid communication with an outlet of the mixer, an outlet in fluid communication with the EGR channel, and a first valve operably controlled by an engine control unit.

9. The opposed-piston engine of claim 8, in which the EGR channel includes a second valve operably controlled by the engine control unit and an EGR cooler between an outlet of the second valve and the outlet of the EGR channel, wherein an inlet of the first valve is coupled to the outlet of the mixer and an outlet of the first valve is coupled to an inlet of the EGR cooler.

10. The opposed-piston engine of claim 1, further including an air intake channel with a valve operably controlled by an engine control unit, the valve having an inlet port operably coupled to a source of inlet air and first and second outlet ports, in which the first outlet port is in fluid communication with the inlet shunt channel and the second outlet is in fluid communication with the compressor inlet.

11. The opposed-piston engine of claim 10, further including a first cooler in fluid communication with the mixer for cooling the charge air provided to the at least one intake port.

12. The opposed-piston engine of claim 11, further including a second cooler in the charge air channel.

13. The opposed-piston engine of claim 11, in which the recirculation channel includes an inlet in fluid communication with an outlet of the first cooler, an outlet in fluid communication with the supercharger inlet, and a valve operably controlled by the engine control unit.

14. The opposed-piston engine of claim 11, in which the recirculation channel includes an inlet in fluid communication with an outlet of the mixer, an outlet in fluid communication with the EGR channel, and a first valve operably controlled by the engine control unit.

15. The opposed-piston engine of claim 14, in which the EGR channel includes a second valve operably controlled by the engine control unit and an EGR cooler between an outlet of the second valve and the outlet of the EGR channel, wherein an inlet of the first valve is coupled to the outlet of the mixer and an outlet of the first valve is coupled to an inlet of the EGR cooler.

16. A method of operating an opposed-piston engine including at least one cylinder with exhaust and intake ports, a charge air channel in fluid communication with at least one intake port of the engine, a supercharger, and a turbocharger, the turbocharger including a turbine inlet, a turbine outlet, a compressor inlet, and a compressor outlet in fluid communication with the charge air channel, comprising:
responding to an engine start condition by:
closing the compressor inlet to a source of inlet air for the engine;
reducing air flow impedance between the turbine inlet and outlet;
establishing fluid communication between the supercharger and the source of inlet air;
closing a supercharger recirculation channel of the engine;
cranking the supercharger; and,
providing inlet air pressurized by the supercharger alone to at least one intake port.

17. The method of claim 16, wherein responding to the engine start condition further includes closing an EGR (exhaust gas recirculation) channel of the engine.

18. The method of claim 17, further comprising detecting an engine load condition following engine startup.

19. The method of claim 18, in which an outlet of the EGR channel is in fluid communication with an inlet of the supercharger, further including responding to the engine load condition by:
opening the compressor inlet to the inlet air source;
increasing the air flow impedance between the turbine inlet and the turbine outlet;
blocking fluid communication between the supercharger and the inlet air source;
opening the EGR channel;
pumping exhaust gas from the EGR channel with the supercharger; and,
providing a mixture of exhaust gas output by the supercharger with charge air from the charge air channel to the at least one intake port.

20. The method of claim 19, further including cooling the mixture before providing it to the at least one intake port.

21. A method of operating an opposed-piston engine including at least one cylinder with exhaust and intake ports, a charge air channel in fluid communication with at least one intake port of the engine, a supercharger, and a turbocharger, the turbocharger including a turbine with an inlet in fluid communication with an exhaust port and an outlet, and a compressor with an inlet and an outlet in fluid communication with the charge air channel, the method comprising:
starting or idling the engine by:
providing a first mass air flow path through the engine that bypasses the compressor and reduces airflow resistance between the turbine inlet and outlet;
and, driving mass air flow through the first mass air flow path with the supercharger; and,
responding to an increase in engine load by:
providing a second mass air flow path through the engine that includes the compressor and increases airflow resistance between the turbine inlet and outlet;
driving mass air flow through the second mass air flow path with the turbocharger;
closing the first mass air flow path; and,
the supercharger alone driving exhaust gas recirculation (EGR) through the engine.

22. The method of claim 21, in which driving mass air flow through the first mass air flow path with the supercharger includes driving EGR through the engine with the supercharger.

23. An opposed-piston engine including at least one cylinder with exhaust and intake ports, a charge air channel to provide charge air to at least one intake port of the engine, and a turbocharger, the turbocharger including a turbine inlet in fluid communication with at least one exhaust port of the engine, a turbine outlet, a compressor inlet for receiving inlet air, and a compressor outlet in fluid communication with the charge air channel, in which the engine comprises:
an EGR (exhaust gas recirculation) channel having an outlet and an inlet in fluid communication with the exhaust port;
a supercharger in fluid communication with the EGR channel outlet to pump exhaust gas through the EGR channel;
a recirculation channel for transporting pressurized air produced by the supercharger to a supercharger inlet;
an inlet shunt channel in fluid communication with the supercharger inlet;
a mixer in fluid communication with a supercharger outlet and the charge air channel, and operable to provide charge air to the at least one intake port; and, an engine control mechanization operable to control the EGR channel, the recirculation channel, and the inlet shunt channel during a start or idle condition by:
closing the EGR and recirculation channels; and,
causing inlet air to be transported to the supercharger inlet through the inlet shunt channel while blocking the compressor inlet.

24. The opposed-piston engine of claim 23, wherein the engine control mechanization is further operable to detect an increase in engine load and to operate the EGR channel, the recirculation channel, and the inlet shunt channel in response to the increase in engine load by:
opening the EGR and recirculation channels; and,
transporting inlet air to the compressor inlet while blocking the inlet shunt channel.

* * * * *